W. F. KILKENNY.
TEA BALL TREE.
APPLICATION FILED AUG. 10, 1914.

1,216,700.

Patented Feb. 20, 1917.

Witnesses
W. W. Bardsley
A. F. Macready

Inventor
William F. Kilkenny
By Howard E. Barlow
Attorney

UNITED STATES PATENT OFFICE.

WILLIAM F. KILKENNY, OF PROVIDENCE, RHODE ISLAND, ASSIGNOR TO STRATHMORE COMPANY, OF PROVIDENCE, RHODE ISLAND, A CORPORATION OF RHODE ISLAND.

TEA-BALL TREE.

1,216,700.

Specification of Letters Patent.  Patented Feb. 20, 1917.

Application filed August 10, 1914.  Serial No. 856,111.

*To all whom it may concern:*

Be it known that I, WILLIAM F. KILKENNY, a citizen of the United States, and resident of Providence, in the county of Providence and State of Rhode Island, have invented certain new and useful Improvements in Tea-Ball Trees, of which the following is a specification.

This invention relates to a tea ball tree or device for supporting a plurality of tea balls or the like in a handy position for use, and the invention has for its object to provide in such a device a base portion having a standard provided with a plurality of arms or supporting members having means whereby each is adapted to have a tea ball or other suitable article suspended therefrom and to also provide in the base of the tree or support a suitable receptacle for receiving the drippings from the tea balls when replaced to suspended position after using.

With these and other objects in view, the invention consists of certain novel features of construction, as will be more fully described, and particularly pointed out in the appended claim.

Figure 1:
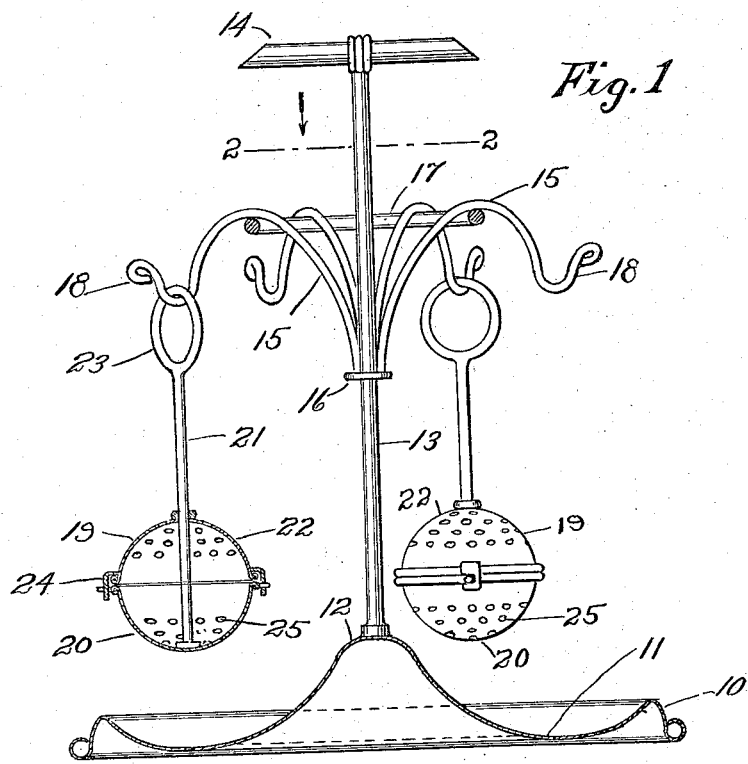
Figure 1 is a sectional elevation of my improved tea ball tree showing a number of tea balls suspended therefrom.
Figure 2:
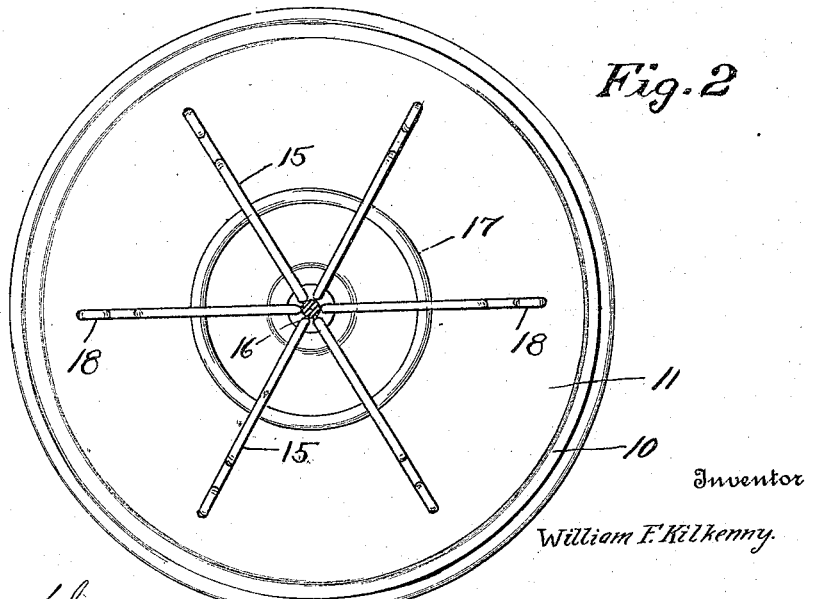
Fig. 2 is a plan view of the tree, the standard being in section on line 2—2 of Fig. 1.

Referring to the drawings 10 designates the base of the tea ball supporting device, which is preferably struck or spun up out of sheet metal, and is herein shown as being in a circular form, but this particular form is not essential. The upper surface of this base is concaved at 11 forming an annular recess for receiving the drip from the tea balls, presently described. The middle portion 12 of this base is preferably raised or thickened and to it is secured a standard 13 which may be made of wire or other suitable material. The top of the standard is provided with a cross bar 14 or other suitable handle by which the device may be readily engaged and moved about by hand.

The primary object of this device is to provide means for supporting a plurality of tea balls in suspended position and any suitable supporting means may be employed for this purpose, but I have herein shown a plurality of arms 15 connected by a collar 16 to the standard, said arms extending upwardly similar to the branches of a tree and over a ring or hoop 17 to which the arms are secured to stiffen the same and better hold them in spaced apart relation. The outer or free ends of these arms are preferably bent downward and into a hook form as at 18 to provide convenient means on which to hang the tea balls. The tea balls 19, themselves, are made in halves and preferably of sheet metal and perforated, the lower portion 20 of said halves being secured to a stem 21 while the upper half 22 is adapted to slide vertically on this stem and the two halves are provided with a suitable lock 24 whereby they may be readily connected together after having been separated to receive the leaves of tea from which the beverage is brewed. The upper end of the stem is provided with a ring or eye 23 by which the tea balls may be readily connected to and suspended from the different arms of the tree. This stem 21 also serves as a convenient handle by which the tea ball may be manipulated.

By this construction it will be seen that the tea balls are suspended from the different arms of the tree directly over the annular groove 11 in the base, whereby the drip from the tea balls after having been used will be received and retained by this groove.

The device is practical in construction and ornamental and attractive in appearance and is of the proper size to set upon a tea or serving table, so that each person may have an individual ball from which to prepare his own tea.

I claim:

In a tea ball supporting device, a base shaped to form a drip trough, an upright rod secured to said base and provided at its upper end with a handle, and a plurality of arms having their inner ends arranged about said rod and secured thereto, said arms radiating from said rod, and terminating in hooks for supporting tea balls directly above said trough, whereby drippings therefrom will be collected in said trough, said trough being provided with a central upstanding tapering boss to deflect drippings into the trough.

In testimony whereof I affix my signature in presence of two witnesses.

WILLIAM F. KILKENNY.

Witnesses:
 HOWARD E. BARLOW,
 A. F. MACREADY.

Copies of this patent may be obtained for five cents each, by addressing the "Commissioner of Patents, Washington, D. C."